(12) United States Patent
Ishii et al.

(10) Patent No.: US 9,200,559 B2
(45) Date of Patent: Dec. 1, 2015

(54) COMBUSTION CHAMBER FOR LARGE GAS ENGINE

(75) Inventors: Hiroyoshi Ishii, Kobe (JP); Tetsuo Tokuoka, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 391 days.

(21) Appl. No.: 13/519,414

(22) PCT Filed: Dec. 27, 2010

(86) PCT No.: PCT/JP2010/007544
§ 371 (c)(1),
(2), (4) Date: Sep. 19, 2012

(87) PCT Pub. No.: WO2011/080914
PCT Pub. Date: Jul. 7, 2011

(65) Prior Publication Data
US 2013/0019837 A1    Jan. 24, 2013

(30) Foreign Application Priority Data
Dec. 28, 2009  (JP) .................................. 2009-297633

(51) Int. Cl.
*F02F 3/12*  (2006.01)
*F02B 19/10*  (2006.01)
(Continued)

(52) U.S. Cl.
CPC ............... *F02B 19/10* (2013.01); *F01B 3/0085* (2013.01); *F02B 19/18* (2013.01); *F02B 43/04* (2013.01);
(Continued)

(58) Field of Classification Search
CPC .. F16J 1/00–1/24; F01B 3/0085; F02F 3/045; F02F 3/12; F02F 3/28; F02F 3/285; F03C 1/0406

USPC ............ 123/144, 143 B, 260, 266, 267–269, 123/277, 295, 298, 305, 193.4, 193.6; 92/172–261

See application file for complete search history.

(56) References Cited

U.S. PATENT DOCUMENTS 1,228,048 A * 5/1917 Rich .............................. 92/176
1,376,621 A * 5/1921 Hildebrand ............ 123/41.82 R
(Continued)

FOREIGN PATENT DOCUMENTS

JP    A-2003-278547    10/2003
JP    A-2008-169706    7/2008
(Continued)

OTHER PUBLICATIONS

Apr. 5, 2011 International Search Report issued in International Patent Application No. PCT/JP2010/007544 (with translation).

*Primary Examiner* — Erick Solis
(74) *Attorney, Agent, or Firm* — Oliff PLC

(57) ABSTRACT

Provided is a combustion chamber applied in a gas engine including: a main combustion chamber including, at a central portion of its ceiling, an auxiliary combustion chamber; and a piston. A peripheral portion of a top surface of the piston is a flat surface. A raised portion, which has a curved surface and which is a solid of revolution, is formed at a central portion of the top surface, the raised portion being joined to the flat surface of the peripheral portion via a curved surface. When the piston is positioned at a top dead center, nozzle holes of the auxiliary combustion chamber jet out flame jets to a portion at which the raised portion of the top surface of the piston and the flat surface of the peripheral portion of the top surface of the piston are joined together.

11 Claims, 3 Drawing Sheets

(51) Int. Cl.
*F01B 3/00* (2006.01)
*F16J 1/09* (2006.01)
*F02B 19/18* (2006.01)
*F02B 43/04* (2006.01)
*F02F 3/28* (2006.01)

(52) U.S. Cl.
CPC ... *F02F 3/12* (2013.01); *F02F 3/28* (2013.01); *F16J 1/09* (2013.01); *Y02T 10/125* (2013.01); *Y02T 10/32* (2013.01)

(56) References Cited

U.S. PATENT DOCUMENTS

| | | | | |
|---|---|---|---|---|
| 4,041,924 A | * | 8/1977 | Grosseau | 123/193.4 |
| 4,127,096 A | * | 11/1978 | Townsend | 123/41.56 |
| 4,128,092 A | * | 12/1978 | Yokota et al. | 123/256 |
| 4,129,101 A | * | 12/1978 | Townsend | 123/41.56 |
| 4,170,966 A | * | 10/1979 | Schmidt | 123/279 |
| 4,312,306 A | * | 1/1982 | Bundrick, Jr. | 123/51 BA |
| 4,333,426 A | * | 6/1982 | Gavasso et al. | 123/90.27 |
| 4,398,513 A | * | 8/1983 | Tanasawa et al. | 123/255 |
| 4,541,377 A | * | 9/1985 | Amos | 123/307 |
| 5,024,193 A | * | 6/1991 | Graze, Jr. | 123/259 |
| 5,067,458 A | * | 11/1991 | Bailey | 123/292 |
| 5,390,634 A | * | 2/1995 | Walters et al. | 123/193.5 |
| 5,447,130 A | * | 9/1995 | Kawamura | 123/269 |
| 5,996,548 A | * | 12/1999 | Hellmich | 123/295 |
| 6,098,588 A | * | 8/2000 | Hufnagel | 123/261 |
| 6,478,006 B1 | * | 11/2002 | Hedelin | 123/259 |
| 7,185,614 B2 | * | 3/2007 | Meffert et al. | 123/41.35 |
| 8,291,911 B2 | * | 10/2012 | Falco et al. | 128/864 |
| 2011/0186002 A1 | * | 8/2011 | Coates | 123/193.6 |

FOREIGN PATENT DOCUMENTS

| | | |
|---|---|---|
| JP | A-2008-280922 | 11/2008 |
| JP | A-2009-2330 | 1/2009 |

* cited by examiner

COMBUSTION CHAMBER FOR LARGE GAS ENGINE

TECHNICAL FIELD

The present invention relates to a combustion chamber in a large gas engine including an auxiliary combustion chamber.

BACKGROUND ART

In a large gas engine including a main combustion chamber and an auxiliary combustion chamber, a fuel gas in the auxiliary combustion chamber, the volume of which is small, is combusted at a theoretical air-fuel ratio. By using the energy of the combustion, a low-concentration lean fuel in the main combustion chamber is combusted. This method realizes lean combustion and makes it possible to perform highly efficient operation in which NOx production is suppressed.

In an engine in which an auxiliary combustion chamber is disposed at the central part of a main combustion chamber, combustion is performed in such a manner that a flame is propagated from the central part to the peripheral part in the main combustion chamber.

If the propagating flame does not reach the peripheral part, the fuel at the peripheral part is not burnt and guided by an exhaust gas pipe together with an exhaust gas to be released to the external air. As a result, engine efficiency degrades.

Moreover, when pressure propagates to the peripheral part due to combustion at the central part, if unburnt gas at the peripheral part is compressed by the pressure and ignited before the flame propagates to the peripheral part, causing knocking, then there is a risk that the pressure and temperature in the combustion chamber rapidly increase, which may cause damage to the engine.

FIG. 5 is a cross-sectional view showing an example of a combustion chamber in a conventional large gas engine.

In a large gas engine having a structure in which nozzle holes of an auxiliary combustion chamber are exposed at the central portion of the ceiling of a main combustion chamber as shown in FIG. 5, a combustion gas produced in the auxiliary combustion chamber is injected into the main combustion chamber as flame jets through the nozzle holes. By the flame jets, a lean fuel in the main combustion chamber is combusted.

A piston cavity is formed at the center of the top surface of a piston. The piston cavity forms a large part of the volume of the combustion chamber when the piston is positioned at the top dead center. By forming the piston cavity, the volume of the main combustion chamber is increased. A side wall of the piston cavity forms a surface which the flame jets hit perpendicularly. A flat surface formed outside of the piston cavity and the ceiling of a cylinder form a top clearance.

In the conventional large gas engine shown in FIG. 5, the flame jets ejected from the nozzle holes of the auxiliary combustion chamber collide with the side wall of the piston cavity. Accordingly, a fuel gas in the piston cavity is combusted. However, a flame that occurs when the fuel gas is combusted by the flame jets takes some time to propagate to the top clearance. Accordingly, combustion in the top clearance is delayed from the combustion in the piston cavity, and thereby knocking occurs. There is also a case where the fuel gas in the top clearance is compressed due to the combustion in the piston cavity and thereby ignited before the flame propagates to the top clearance, causing knocking. This may cause damage to the engine.

In this respect, there is a method of preventing knocking in the following manner: the volume of the peripheral part of a combustion chamber is designed to be small and thereby the amount of fuel at the peripheral part is reduced, so that the amount of unburnt gas released to the atmosphere is reduced; and wall cooling is performed to suppress ignition.

However, in the case where the volume of the peripheral part of the combustion chamber is designed to be small, it is necessary to design the volume of the central part of the main combustion chamber to be great in order to maintain a certain compression ratio. Moreover, if the volume of the peripheral part is designed to be small, there is a case where it becomes necessary to form a valve recess in order to prevent interference between the piston and supply and exhaust valves. However, smooth flame propagation to the valve recess is more difficult.

Patent Literature 1 discloses a divided-chamber engine, in which the shape of a nozzle hole of an auxiliary combustion chamber is optimized, such that a flame jet directly reaches a valve recess at a peripheral part. In this manner, flame propagation to the valve recess is facilitated. However, in the method disclosed in Patent Literature 1, it is difficult for a fuel gas to flow into the peripheral part, and the concentration of the fuel gas at the peripheral part is low, accordingly. Moreover, since a wall cooling effect is exerted, even if the flame jet from the auxiliary combustion chamber reaches the peripheral part, combustion does not easily occur and unburnt gas remains at the peripheral part. Furthermore, since the fuel gas at the peripheral part is combusted at last, there is a high possibility that knocking occurs.

CITATION LIST

Patent Literature

PTL 1: Japanese Laid-Open Patent Application Publication No. 2003-278547

SUMMARY OF INVENTION

Technical Problem

Therefore, a problem to be solved by the present invention is to provide a combustion chamber structure for a large gas engine including a main combustion chamber and an auxiliary combustion chamber, the combustion chamber structure exerting advantageous effects of suppressing knocking and reducing the amount of unburnt gas to be released to the atmosphere.

Solution to Problem

In order to solve the above problem, a gas engine combustion chamber according to the present invention is a combustion chamber of an engine including: a main combustion chamber including, at a central portion of its ceiling, an auxiliary combustion chamber having nozzle holes exposed within the main combustion chamber; and a piston inserted in the main combustion chamber in a slidable manner. A peripheral portion of a top surface of the piston is a flat surface. A raised portion is formed at a central portion of the piston. The structure of the gas engine combustion chamber has the following feature: each nozzle hole of the auxiliary combustion chamber is formed such that, when the piston is positioned at a top dead center, a central axis of the nozzle hole is directed to a portion at which the raised portion of the top surface of the piston and the flat surface of the peripheral portion of the top surface of the piston are joined together.

It should be noted that the raised portion formed at the central portion of the piston may be a smooth protrusion which is formed as a solid of revolution whose axis of revolution is a central axis of the piston.

It is preferred that a distance to an edge of the piston from the portion at which the raised portion of the top surface of the piston and the flat surface of the peripheral portion of the top surface of the piston are joined together is a distance that allows a flame occurring at an upper surface of a cylinder due to a nozzle gas ejected from the nozzle holes of the auxiliary combustion chamber to propagate to an inner wall surface of a cylinder head before an inner wall surface of a cylinder liner is exposed within the main combustion chamber due to the piston starting lowering.

According to the combustion chamber of the present invention, a fuel gas is supplied to the central portion of the piston in the engine's suction stroke. Therefore, at the beginning of a compression stroke, the fuel gas in high concentration is distributed unevenly such that the fuel gas in high concentration exists at the central portion of the top surface of the piston at the bottom of the cylinder. However, since the smooth raised portion is formed at the central portion of the top surface of the piston, when the piston moves toward the ceiling of the cylinder, gas streams occur within the cylinder, flowing from the central portion of the piston toward the peripheral part of the cylinder and from the bottom of the cylinder toward the ceiling of the cylinder, and thereby the fuel gas is mixed.

When the piston is positioned at the top dead center, the combustion chamber is space having a narrow discoid shape, which is formed between the top surface of the piston and the ceiling of the cylinder. Here, the fuel gas in the combustion chamber is distributed such that the gas concentration at the peripheral part of the combustion chamber is higher than the gas concentration at the central part of the combustion chamber. It should be noted that the concentration of the fuel gas is highest around the base portion of the raised portion.

As described above, according to the combustion chamber of the present invention, the volume of the peripheral part of the main combustion chamber is increased; a flow of the fuel into the peripheral part of the main combustion chamber is facilitated; portions existing in a conventional main combustion chamber such as a valve recess and a top clearance, in which the gas concentration of lean gas tends to be further reduced, are eliminated; and thus the presence of lean gas at the peripheral part, which causes post ignition, is eliminated.

Accordingly, in a combustion stroke following the compression stroke, when the fuel gas in high concentration with an excess air ratio of approximately 1 is ignited in the auxiliary combustion chamber and a combustion gas is jetted out as flame jets through the plurality of nozzle holes which are arranged on the same circle, the combustion progresses at the peripheral part without delay for the following reason: the gas at the central part of the main combustion chamber is leaner and its ignitability is relatively low, whereas the fuel gas concentration at the peripheral part is higher. Thus, an occurrence of unburnt gas is suppressed, and at the peripheral part, combustion due to flame propagation occurs before an ignition due to pressure propagation occurs. This reduces a risk of knocking.

It is preferred that the flame jets supplied from the nozzle holes of the auxiliary combustion chamber cause such flame propagation within the combustion chamber that the fuel gas in the combustion chamber is combusted with simultaneity within a shortest possible time.

If the flame jets, or the flame that occurs when the lean fuel gas is ignited, comes into direct contact with the surface of the cylinder liner, then the life of the cylinder liner within which the piston ring moves in a sliding manner is reduced, which results in increased burden and costs of repairing.

On the other hand, according to the combustion chamber of the present invention, in the combustion stroke, the flame jets from the nozzle holes hit the base portion of the raised portion of the top surface of the piston, at which base portion the fuel gas concentration is highest. Then, the flame propagates from the base portion of the raised portion to the peripheral part and the central part of the combustion chamber. Therefore, the fuel gas in the chamber is combusted within a short period of time.

According to the structure of the combustion chamber of the present invention, the flame jets hit the base portion of the raised portion of the top surface of the piston, and the flame that occurs when the lean fuel gas is ignited by the flame jets can be caused to reach the inner wall of the cylinder head before the cylinder liner becomes exposed within the combustion chamber due to the piston starting lowering.

As described above, by suitably setting the distance between the edge of the piston and the base portion of the raised portion, damage to the cylinder liner can be suppressed and thereby the cylinder liner can be made long-lived. It should be noted that the optimal value of a time that the flame takes to propagate from the ignition point to the inner wall of the cylinder head varies depending on, for example, the engine size and engine speed. Therefore, it is necessary to set the position of the base portion of the raised portion, such that the position matches such conditions.

Moreover, the flame jets are projected not onto the vicinity of the peripheral edge of the top surface of the piston but onto the raised portion's base portion which is slightly away from the peripheral edge toward the central portion. This makes it possible to prevent overheating of the piston's periphery, thereby protecting the cylinder liner.

As described above, the combustion chamber of the present invention provides advantageous effects of suppressing knocking and reducing the amount of unburnt gas to be released to the atmosphere.

Further, in order to solve the aforementioned problem, a piston for use in a gas engine according to the present invention has the following features: a peripheral portion of a top surface of the piston is a flat surface; and a smooth raised portion which is a solid of revolution, whose axis of revolution is a central axis of the piston, is formed at a central portion of the top surface.

It is preferred that the raised portion, which is formed at the central portion of the top surface of the piston, has a side formed as a conical surface inclined by an angle of 5° or more, and the angle is smaller than an angle of depression of nozzle holes of an auxiliary combustion chamber. It is particularly preferred that the inclination angle of the conical surface is in a range from 5° to 20°.

If the piston is sectioned by a plane containing the central axis of the piston, a profile line of the top surface of the piston is preferably a smooth line represented by a graph, in which: an inclination of the profile line with respect to the flat surface of the peripheral portion starts increasing continuously from zero near a starting point of the raised portion and thereafter decreases continuously; and the inclination becomes zero again at a peak of the raised portion.

Since the smooth raised portion is formed as above, a strong fuel gas stream smoothly occurs in a compression stroke. As a result, the fuel gas is sufficiently mixed and the gas distribution becomes even.

Further, a distance to an edge of the piston from a position where the flat surface of the peripheral portion and the raised portion of the central portion are joined together is preferably a distance that allows, in a combustion stroke of the engine, a flame occurring at an upper surface of a cylinder head due to a nozzle gas ejected as flame jets from nozzle holes of an auxiliary combustion chamber to propagate to an inner wall surface of the cylinder head before an inner wall surface of a cylinder liner is exposed within a main combustion chamber due to the piston starting lowering.

In this manner, the cylinder liner can be protected and made long-lived.

The piston for use in a gas engine according to the present invention, when applied in the above-described structure of the gas engine combustion chamber according to the present invention, exerts advantageous effects of suppressing knocking and reducing the amount of unburnt gas to be released to the atmosphere.

Advantageous Effects of Invention

By employing the gas engine combustion chamber and the piston for use in a gas engine according to the present invention, a large gas engine capable of suppressing the discharging of unburnt gas, suppressing knocking, and achieving high thermal efficiency can be provided.

DESCRIPTION OF EMBODIMENTS

Hereinafter, the structure of a gas engine combustion chamber according to the present invention is described in detail by using one embodiment with reference to the accompanying drawings.

Figure 1:
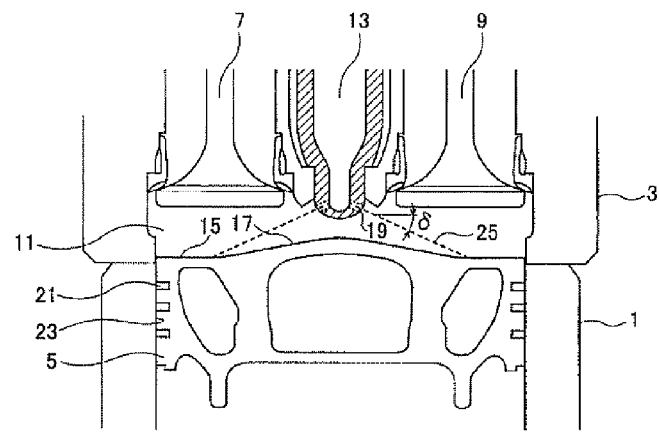
FIG. 1 is a partial cross-sectional view of a gas engine combustion chamber according to one embodiment of the present invention.

FIG. 1 is a partial cross-sectional view of a gas engine combustion chamber according to one embodiment of the present invention.

The combustion chamber according to the present embodiment is applied in a large gas engine. The combustion chamber includes a main combustion chamber 11 and an auxiliary combustion chamber 13. The main combustion chamber 11 is formed by an upper surface of a cylinder head 3, an inner wall surface of the cylinder head 3 (including an inner wall surface of a cylinder liner 1 when a piston 5 is located at a lower position), and a top surface of the piston 5.

The auxiliary combustion chamber 13 is incorporated in the cylinder head 3, and a plurality of nozzle holes 19 of the auxiliary combustion chamber 13, which extend in a radial manner, are circumferentially arranged at the central portion of the ceiling of the main combustion chamber 11 and are exposed within the main combustion chamber 11.

It should be noted that the cylinder head 3 is fixed to the top of the cylinder liner 1, thereby forming the ceiling part of the combustion chamber. A supply and exhaust system including an air supply valve 7 and an exhaust valve 9, and a valve-driving system which is not shown, are mounted to the cylinder head 3.

The piston 5 is such that the peripheral portion of the top surface of the piston 5 is a flat surface 15. A smooth raised portion 17 is formed at the central portion of the top surface. The smooth raised portion 17 is a solid of revolution whose axis of revolution is the central axis of the piston 5.

Figure 2:
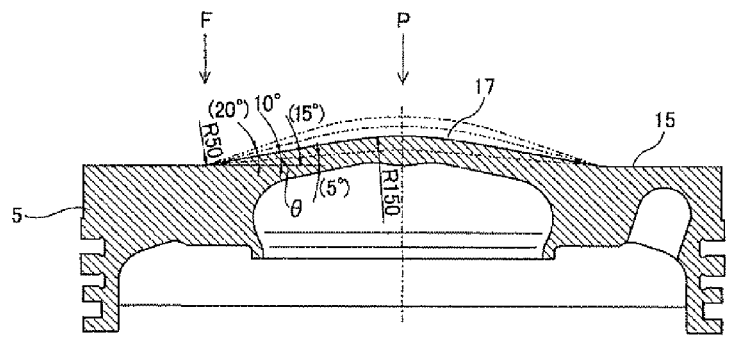
FIG. 2 is a cross-sectional view of a piston head used in the embodiment.

FIG. 2 is a cross-sectional view along a plane containing the central axis of the piston, showing a main part of a piston head used in the present embodiment. The raised portion 17, which has its peak P on the central axis of the piston, is formed at the top surface of the piston 5. The raised portion 17 is a conoid body, and its portion around the peak P is formed in a spherical shape. The conical surface of the raised portion 17 has a gradual inclination angle $\theta$ of approximately 5° to 20°. It should be noted that the inclination angle $\theta$ of the conical surface is preferably smaller than the angle of depression $\delta$ of flame jets that are jetted out as nozzle gas from the nozzle holes 19 of the auxiliary combustion chamber 13.

The base portion of the raised portion 17, which includes a position F where the extension of the conical surface of the raised portion 17 and the peripheral flat surface 15 meet, is joined to the flat surface 15 via, for example, a curved surface having a curvature radius of 50 mm, such that the joint between the peripheral flat surface 15 and the conical surface of the raised portion 17 is smooth.

Most of the side face of the raised portion 17 is formed as a conical surface having a constant inclination angle $\theta$ which is, for example, approximately 10°. A portion around the peak P of the raised portion 17, the peak P being on the central axis of the piston 5, is spherically formed to have a radius of, for example, 150 mm.

Figure 3:
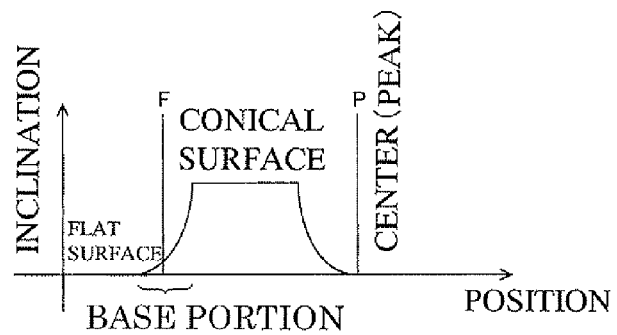
FIG. 3 is a graph showing changes in the inclination of the edge line of the top surface of the piston head used in the embodiment.

FIG. 3 is a graph showing changes in the inclination of an edge line regarding an example of the top surface of the piston head. FIG. 3 represents inclinations of the edge line at respective points from the edge of the top surface of the piston 5 to the central axis of the piston.

The inclination of the flat surface 15 formed at the peripheral portion of the top surface of the piston 5, the flat surface 15 extending inward from the edge of the top surface of the piston 5, is zero. The inclination of the edge line of a constant-curvature curved surface formed at the base portion of the raised portion, the base portion including the position F where the flat surface 15 and the extension of the conical surface meet, increases sine functionally.

The inclination of the conical surface of the side face of the raised portion 17 has a constant value. The inclination of the edge line near the peak P of the raised portion 17 decreases sine functionally and the inclination becomes zero again at the peak P.

The solid of revolution represented in FIG. 3, the edge line of which has a continuously varying inclination, forms the raised portion 17 which is a smooth-surfaced portion with no sharp projecting point or no broken line having a corner. Accordingly, the raised portion 17 does not disturb a flow of a generated gas stream. Moreover, while the engine is operating, an occurrence of, for example, the following phenomenon is prevented: the temperature of a projecting point or a cornered portion becomes high and ignites a fuel gas, thereby causing a decrease in engine efficiency.

Figure 4A:
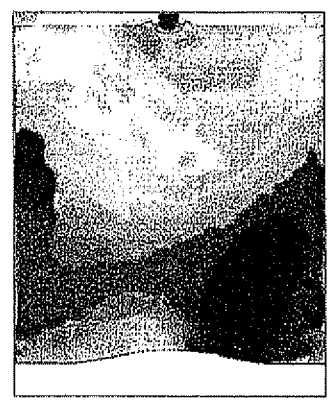
FIGS. 4A to 4C show changes in a fuel gas concentration distribution in the combustion chamber according to the embodiment.
Figure 4B:
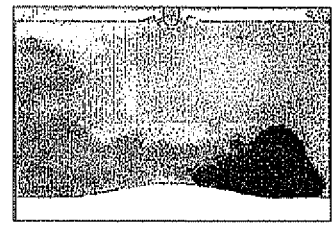
Figure 4C:
Figure 5:
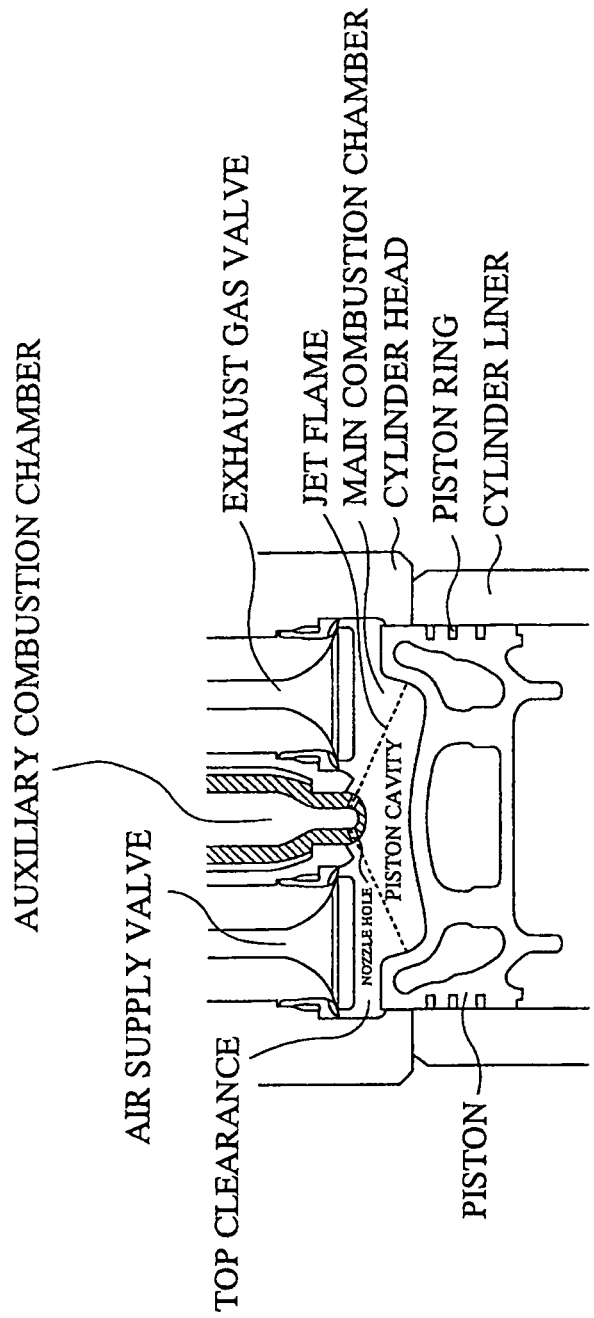
FIG. 5 is a partial cross-sectional view of a combustion chamber of a conventional gas engine.

FIGS. 4A to 4C show changes in a fuel gas concentration in the combustion chamber according to the present embodiment during a compression stroke, based on results of analysis using CFD (Computational Fluid Dynamics), assuming a case where the piston according to the present embodiment which has a raised portion at its top surface is used. Each of FIGS. 4A, 4B, and 4C represents a distribution of fuel gas concentration in the main combustion chamber 11 with light and dark shading. In each of the diagrams, the lower end portion represents the top surface of the piston; the top end portion represents the ceiling of the cylinder; and the left and right end portions represent the inner walls of the cylinder liner and the cylinder head. FIG. 4A shows a state where a short time has passed after the start of the compression stroke; FIG. 4B shows a state where the piston has been lifted to a substantially middle position; and FIG. 4C shows a state where the piston is located at the top dead center position right before a flame is ignited.

According to the structure of the combustion chamber of the present embodiment, the fuel is supplied to the central portion of the piston in the engine's suction stroke. Therefore, as shown in FIG. 4A, at the beginning of the compression stroke, the fuel gas in high concentration is distributed unevenly such that the fuel gas in high concentration exists at the central portion of the top surface of the piston 5 at the bottom of the main combustion chamber 11.

However, since the smooth raised portion 17 is formed at the central portion of the top surface of the piston 5, when the piston 5 moves toward the ceiling of the main combustion chamber 11, gas streams occur within the main combustion chamber, flowing from the central portion of the piston toward the peripheral part of the combustion chamber and from the bottom of the main combustion chamber 11 toward the ceiling. As a result, as shown in FIG. 4B, the fuel gas is mixed within the main combustion chamber 11, and thereby the gas concentration becomes more even.

When the piston 5 reaches the top dead center, the main combustion chamber 11 becomes space having a thin discoid shape, which is formed between the top surface of the piston 5 and the ceiling of the main combustion chamber 11. Here, the fuel gas in the main combustion chamber 11 is distributed as shown in FIG. 4C, such that the gas concentration at the peripheral part of the main combustion chamber 11 is higher than the gas concentration at the central part of the main combustion chamber 11. It should be noted that the concentration of the fuel gas is highest around the base portion of the raised portion 17 of the top surface of the piston 5.

If there is a narrow portion in the main combustion chamber 11, into which the fuel gas does not easily flow, then there may be a case where knocking occurs due to combustion occurring in the narrow portion earlier or later than the main combustion in the main combustion chamber 11, or there may be a case where the fuel gas in the narrow portion is not combusted and discharged wastefully, which causes a decrease in thermal efficiency.

According to the structure of the combustion chamber of the present embodiment, conventional narrow portions such as a valve recess and a top clearance, in which the gas concentration of lean gas tends to be further reduced, are eliminated and the volume of the peripheral part of the main combustion chamber 11 is increased, which allows the fuel gas to easily flow into the peripheral part. Moreover, the raised portion 17 of the top surface of the piston 5 allows fuel gas streams to develop within the main combustion chamber 11. As a result, the presence of lean gas at the peripheral part, which causes post ignition, is eliminated.

In the combustion chamber according to the present embodiment, in a combustion stroke following the compression stroke, the fuel gas in high concentration with an excess air ratio of approximately 1 is ignited in the auxiliary combustion chamber 13, and a combustion gas is jetted into the main combustion chamber 11 as flame jets 25 through the plurality of nozzle holes 19 which are arranged on the same circle. In this manner, a lean fuel gas in the main combustion chamber 11, the excess air ratio of which is 2 or higher, is ignited. The fuel gas at the central part of the main combustion chamber 11 is leaner and its ignitability is relatively low, whereas the fuel gas concentration at the peripheral part is higher. Therefore, combustion progresses at the peripheral part without delay. For this reason, an occurrence of unburnt gas is suppressed, and at the peripheral part, combustion due to flame propagation occurs before knocking due to pressure propagation occurs. Thus, an occurrence of knocking is also suppressed.

The shape of the raised portion 17 is not limited to a smooth conoid shape, but may be any shape so long as the raised portion 17 is a suitable protrusion having a smooth surface that allows a gas stream to occur with a suitable intensity in the main combustion chamber 11.

In a case where the raised portion 17 has a conoid shape, the force that pushes the fuel gas to the peripheral portion side is increased in accordance with an increase in the inclination angle $\theta$ of the conical surface. Thus, the measure of the inclination angle $\theta$ affects the fuel gas concentration distribution within the main combustion chamber 11.

In a case where the speed of the piston 5 is fixed, if the inclination angle $\theta$ of the conical surface is excessively great, then a strong fuel gas stream flows from the central portion to the peripheral portion at the bottom of the main combustion chamber 11. This evens out the fuel gas concentration excessively. As a result, the concentration of the fuel gas cannot be made high at the peripheral part of the main combustion chamber 11. If the inclination angle $\theta$ of the conical surface is excessively small, then the intensity of the fuel gas stream from the central portion to the peripheral portion becomes weak. As a result, the gas concentration is not sufficiently evened out.

The inclination angle $\theta$ is preferably 5° or greater and is smaller than or equal to the angle of depression 6 defined by the jetting direction of the flame jets 25. It is particularly preferred that the inclination angle $\theta$ is in a range from 5° to 20°.

Further, by using CFA analysis, the inclination angle $\theta$ that allows the fuel gas concentration to be highest at the raised portion's base portion, onto which the flame jets are projected, can be obtained. Under the conditions of the present embodiment, it has been confirmed that when the inclination angle $\theta$ of the conical surface is approximately 10°, a high-concentration fuel gas region is formed at the base portion of the raised portion as shown in FIG. 4C.

It should be noted that since piston rings 21 move in a sliding manner on a cylinder liner surface 23, engine output can be secured while maintaining the airtightness of the main combustion chamber 11. However, if the flame is directly projected onto the cylinder liner surface 23, then the liner surface becomes damaged and the airtightness is lost after a short period of operation. This results in increased burden on maintenance work.

Therefore, in the present embodiment, it is preferred to limit flame jet projection points on the top surface of the piston 5 to adjust the flame jets and the propagation time of a flame that is ignited by the flame jets so that the flame will not be directly projected onto the liner surface.

The cylinder liner surface 23, on which the piston rings 21 move in a sliding manner, is formed at the inner wall of the cylinder liner 1. The piston rings 21 do not move in a sliding manner on the cylinder surface of the cylinder head 3. Therefore, it is suitable to choose such a shape as to allow the flame occurring due to the combustion of the fuel gas ignited by the flame jets to propagate to the inner wall of the cylinder head, after the top surface of the piston 5 reaches a height where the cylinder liner 1 and the cylinder head 3 are joined together, and before the cylinder liner surface 23 of the cylinder liner 1 becomes exposed within the main combustion chamber 11 due to the piston 5 starting lowering.

Here, explanation is given in terms of a crank angle CA which is defined as 0° at the top dead center. After the top surface of the piston 5 has reached the height where the cylinder liner 1 and the cylinder head 3 are joined together, the piston 5 starts lowering. Then, the cylinder liner surface 23 becomes exposed within the main combustion chamber 11 usually when the CA becomes approximately 25°. When it is assumed that a flame is ignited at CA 5°, the flame jet projection points may be set such that, after the flame is ignited, the flame reaches the inner wall of the cylinder within a CA difference of approximately 20°. It should be noted that in the case of adjusting the flame jet projection points such that the flame jets hit the base portion of the raised portion, the distance between the base portion of the raised portion and the edge of the piston 5 may be suitably set.

It should be noted that the number of nozzle holes 19 of the auxiliary combustion chamber 13 are suitably chosen, such as 4, 6, or 8 nozzle holes, in accordance with the size of the main combustion chamber, and that the nozzle holes 19 have such an angle of depression δ that, when the piston 5 is positioned at the top dead center, the nozzle holes 19 jet out combustion gas flame jets 25 to a portion where the raised portion 17 of the top surface of the piston and the peripheral flat surface 15 meet, that is, the base portion of the raised portion 17.

As a result of applying the structure of the combustion chamber according to the present embodiment in a large gas engine, the thermal efficiency of the engine was improved by approximately 0.8% in terms of absolute value. The absolute value of the thermal efficiency herein refers to the proportion of the energy outputted from the engine to the energy of supplied fuel. Further, the amount of discharged unburnt fuel gas was reduced by approximately 30%.

REFERENCE SIGNS LIST

1 cylinder liner
3 cylinder head
5 piston
7 air supply valve
9 exhaust valve
11 main combustion chamber
13 auxiliary combustion chamber
15 flat surface
17 raised portion
19 nozzle hole
21 piston ring
23 cylinder liner surface
25 flame jet

The invention claimed is:

1. A gas engine combustion chamber applied in a gas engine including: a main combustion chamber including, at a central portion of its ceiling, an auxiliary combustion chamber having nozzle holes exposed within the main combustion chamber; and a piston inserted in the main combustion chamber in a slidable manner, wherein
   a peripheral portion of a top surface of the piston is a flat surface,
   a raised portion is formed at a central portion of the top surface of the piston, the raised portion being raised upward from the peripheral portion,
   the nozzle holes of the auxiliary combustion chamber are formed such that, when the piston is positioned at a top dead center, central axes of the respective nozzle holes are directed to a portion, of the piston, at which the raised portion and the flat surface are joined together, and
   when the piston is positioned at the top dead center, the nozzle holes of the auxiliary combustion chamber jet out a nozzle gas to the portion, of the piston, at which the raised portion and the flat surface are joined together.

2. The gas engine combustion chamber according to claim 1, wherein
   a distance to an edge of the piston from the portion, of the piston, at which the raised portion and the peripheral portion are joined together is a distance that allows a flame occurring at an upper surface of a cylinder head due to the nozzle gas ejected from the nozzle holes of the auxiliary combustion chamber to propagate to an inner wall surface of the cylinder head before an inner wall surface of a cylinder liner is exposed within the main combustion chamber due to the piston starting lowering.

3. A piston for use in a gas engine, wherein
   a peripheral portion of a top surface of the piston is a flat surface,
   a raised portion which is a solid of revolution, whose axis of revolution is a central axis of the piston, is formed at a central portion of the top surface, the raised portion being continuously raised upward from a portion at which the raised portion and the flat surface are joined together to a center of the central portion, the raised portion including an upward protruding top portion with a curved surface, and
   the raised portion and the flat surface are smoothly continuous with each other.

4. The piston for use in a gas engine, according to claim 3, wherein
   the raised portion has a side formed as a conical surface inclined by an angle of 5° or more, and the angle is smaller than an angle of depression of nozzle holes of an auxiliary combustion chamber.

5. The piston for use in a gas engine according to claim 3, wherein
   if the piston is sectioned by a plane containing the central axis of the piston, a profile line of the top surface of the piston is a smooth line represented by a graph, in which: an inclination of the profile line with respect to the flat surface of the peripheral portion is zero at the peripheral portion; the inclination starts increasing continuously from zero near a starting point of the raised portion and thereafter decreases; and the inclination becomes zero again at a peak of the raised portion.

6. The piston for use in a gas engine, according to claim 3, wherein
   a distance to a side edge of the piston from a position where the flat surface and the raised portion are joined together is a distance that allows, in a combustion stroke of the engine, a flame occurring at an upper surface of a cylinder head due to a nozzle gas ejected from nozzle holes of an auxiliary combustion chamber to propagate to an inner wall surface of the cylinder head before an inner wall surface of a cylinder liner is exposed within a main combustion chamber due to the piston starting lowering.

7. The piston for use in a gas engine according to claim 4, wherein
   if the piston is sectioned by a plane containing the central axis of the piston, a profile line of the top surface of the piston is a smooth line represented by a graph, in which: an inclination of the profile line with respect to the flat surface of the peripheral portion is zero at the peripheral portion; the inclination starts increasing continuously from zero near a starting point of the raised portion and thereafter decreases; and the inclination becomes zero again at a peak of the raised portion.

8. The piston for use in a gas engine, according to claim 4, wherein a distance to a side edge of the piston from a position where the flat surface and the raised portion are joined together is a distance that allows, in a combustion stroke of the engine, a flame occurring at an upper surface of a cylinder head due to a nozzle gas ejected from nozzle holes of an auxiliary combustion chamber to propagate to an inner wall surface of the cylinder head before an inner wall surface of a cylinder liner is exposed within a main combustion chamber due to the piston starting lowering.

9. The piston for use in a gas engine, according to claim 5, wherein a distance to a side edge of the piston from a position where the flat surface and the raised portion are joined together is a distance that allows, in a combustion stroke of the engine, a flame occurring at an upper surface of a cylinder head due to a nozzle gas ejected from nozzle holes of an auxiliary combustion chamber to propagate to an inner wall surface of the cylinder head before an inner wall surface of a cylinder liner is exposed within a main combustion chamber due to the piston starting lowering.

10. The gas engine combustion chamber according to claim 1, wherein the raised portion is a conoid body, and a portion around a peak of the raised portion is formed in a spherical shape.

11. The piston for use in a gas engine, according to claim 3, wherein the raised portion is a conoid body, and a portion around a peak of the raised portion is formed in a spherical shape.

* * * * *